US011247393B2

(12) United States Patent
Cilia et al.

(10) Patent No.: US 11,247,393 B2
(45) Date of Patent: *Feb. 15, 2022

(54) ADDITIVE MANUFACTURING SYSTEMS AND METHODS INCLUDING ROTATING BINDER JET PRINT HEAD

(71) Applicant: General Electric Company, Schenectady, NY (US)

(72) Inventors: Juan Pablo Cilia, Delmar, NY (US); John Paul Davis, Duanesburg, NY (US); William Thomas Carter, Galway, NY (US); Jared Micheal Iverson, Galway, NY (US); Michael Robert Tucker, Niskayuna, NY (US); Michael Evans Graham, Slingerlands, NY (US); Edward James Nieters, Burnt Hills, NY (US)

(73) Assignee: General Electric Company, Schenectady, NY (US)

(*) Notice: Subject to any disclaimer, the term of this patent is extended or adjusted under 35 U.S.C. 154(b) by 126 days.

This patent is subject to a terminal disclaimer.

(21) Appl. No.: 16/426,130

(22) Filed: May 30, 2019

(65) Prior Publication Data

US 2020/0376752 A1 Dec. 3, 2020

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/214* (2017.08); *B29C 64/227* (2017.08);
(Continued)

(58) Field of Classification Search
CPC ..... B29C 64/165; B29C 64/214; B29C 64/35; B29C 64/241; B29C 64/188; B29C 64/218; B29C 64/227; B33Y 30/00
See application file for complete search history.

(56) References Cited

U.S. PATENT DOCUMENTS 7,291,002 B2 11/2007 Russell et al.
2015/0183161 A1 7/2015 Molinari et al.
(Continued)

FOREIGN PATENT DOCUMENTS

CN 105710309 A 6/2016
CN 207859497 U 9/2018
(Continued)

OTHER PUBLICATIONS

Balakrishna. G et al., "Design and fabrication of powder based binder Jetting 3d printer", International Journal of Recent Trends in Engineering & Research (IJRTER), pp. 142-150 vol. 03, Issue: 09, Sep. 2017.
(Continued)

*Primary Examiner* — Joseph S Del Sole
*Assistant Examiner* — Ariella Machness
(74) *Attorney, Agent, or Firm* — Dority & Manning, P.A.

(57) ABSTRACT

Methods and systems for fabricating a component by consolidating a particulate include a build platform configured to receive a particulate, a particulate dispenser configured to deposit the particulate on the build platform, and at least one print head including at least one jet. The at least one print head is configured to dispense a binder through the at least one jet onto the particulate to consolidate at least a portion of the particulate and form a component. The methods and systems also include at least one actuator assembly configured to rotate at least one of the at least one print head and the build platform about a rotation axis extending through
(Continued)

the build platform and move at least one of the at least one print head and the build platform in a build direction perpendicular to the build platform as part of a helical build process for the component.

16 Claims, 12 Drawing Sheets

(51) Int. Cl.
*B33Y 30/00* (2015.01)
*B29C 64/227* (2017.01)
*B29C 64/35* (2017.01)
*B33Y 40/00* (2020.01)
*B29C 64/214* (2017.01)
*B29C 64/393* (2017.01)
*B33Y 50/02* (2015.01)

(52) U.S. Cl.
CPC .............. *B29C 64/35* (2017.08); *B33Y 10/00* (2014.12); *B33Y 30/00* (2014.12); *B33Y 40/00* (2014.12); *B29C 64/393* (2017.08); *B33Y 50/02* (2014.12)

(56) References Cited

U.S. PATENT DOCUMENTS

| | | | |
|---|---|---|---|
| 2016/0136759 A1* | 5/2016 | Broda | B23K 37/047 |
| | | | 219/76.1 |
| 2017/0190112 A1* | 7/2017 | Thorson | B33Y 50/00 |
| 2018/0050499 A1 | 2/2018 | Makover et al. | |
| 2018/0065293 A1* | 3/2018 | Jeon | B29C 64/112 |
| 2018/0339450 A1* | 11/2018 | Franklin | B29C 64/277 |
| 2020/0038952 A1* | 2/2020 | Stuart | B29C 64/165 |

FOREIGN PATENT DOCUMENTS

| | | |
|---|---|---|
| EP | 3 015 252 A1 | 5/2016 |
| EP | 3 441 164 A1 | 2/2019 |
| WO | WO 2004/106041 A2 | 12/2004 |
| WO | 2017008777 A1 | 1/2017 |

OTHER PUBLICATIONS

Ian Gibson et al. "Binder Jetting", Additive Manufacturing Technologies, pp. 205-218, New York, 2015.
EPO Search Report, dated Jan. 21, 2021.

* cited by examiner

ADDITIVE MANUFACTURING SYSTEMS AND METHODS INCLUDING ROTATING BINDER JET PRINT HEAD

BACKGROUND

The subject matter described herein relates generally to additive manufacturing systems and, more particularly, to additive manufacturing systems including a binder jet print head that rotates relative to a build platform.

At least some known additive manufacturing systems involve the consolidation of a particulate to fabricate a component. Such techniques facilitate producing complex components from particulate materials at a reduced cost and with improved manufacturing efficiency. At least some known additive manufacturing systems fabricate components using one or more binder jet print heads that dispense a binder onto a particulate. In addition, in at least some additive manufacturing systems, one or more actuators are used to move the build platform during fabrication of the component. However, the size of the fabricated components is limited by the configuration of the binder jet print heads, the actuators, and the build platform.

In addition, in at least some known additive manufacturing systems, a recoater is used to distribute the particulate on the build platform. For example, in some embodiments, a recoater moves the particulate from a container onto and across the build platform. The recoater and the binder jet print head are operated at separate times, because the binder jet print head cannot consolidate the particulate while the recoater is spreading the particulate. As a result, the time required for fabricating the components is increased to accommodate sequential operation of the recoater and the binder jet print head.

Accordingly, there is a need for an improved additive manufacturing system including a binder jet print head that allows for fabrication of components of any size in a reduced time.

BRIEF DESCRIPTION

In one aspect, an additive manufacturing system is provided. The additive manufacturing system includes a build platform configured to receive a particulate and a particulate dispenser configured to deposit the particulate on the build platform. The additive manufacturing system also includes at least one print head including at least one jet. The at least one print head is configured to dispense a binder through the at least one jet onto the particulate to consolidate at least a portion of the particulate and form a component. The additive manufacturing system further includes at least one arm extending at least partially across the build platform and configured to support the at least one print head. The additive manufacturing system also includes at least one actuator assembly configured to rotate at least one of the at least one print head and the build platform about a rotation axis extending through the build platform and move at least one of the at least one print head and the build platform in a build direction perpendicular to the build platform as part of a helical build process for the component.

In another aspect, a method of fabricating a component using an additive manufacturing system is provided. The method includes depositing a particulate on a build platform and rotating at least one recoater blade relative to the build platform about a rotation axis extending through the build platform. The method also includes contacting the particulate on the build platform using the at least one recoater blade to distribute the particulate across the build platform. The method further includes rotating at least one print head relative to the build platform about the rotation axis. The at least one print head includes at least one jet. The method also includes dispensing a binder through the at least one jet onto the particulate to consolidate at least a portion of the particulate.

In yet another aspect, an additive manufacturing system is provided. The additive manufacturing system includes a build platform configured to receive a particulate, a particulate dispenser configured to deposit the particulate on the build platform, and at least one print head including at least one jet. The at least one print head is configured to dispense a binder through the at least one jet onto the particulate to consolidate at least a portion of the particulate and form a component. The additive manufacturing system also includes at least one actuator assembly configured to rotate the at least one print head relative to the build platform about a rotation axis extending through a center of the build platform and move the at least one print head in a build direction perpendicular to the build platform as the at least one print head is rotated.

DRAWINGS

These and other features, aspects, and advantages of the present disclosure will become better understood when the following detailed description is read with reference to the accompanying drawings in which like characters represent like parts throughout the drawings, wherein.

Figure 1:
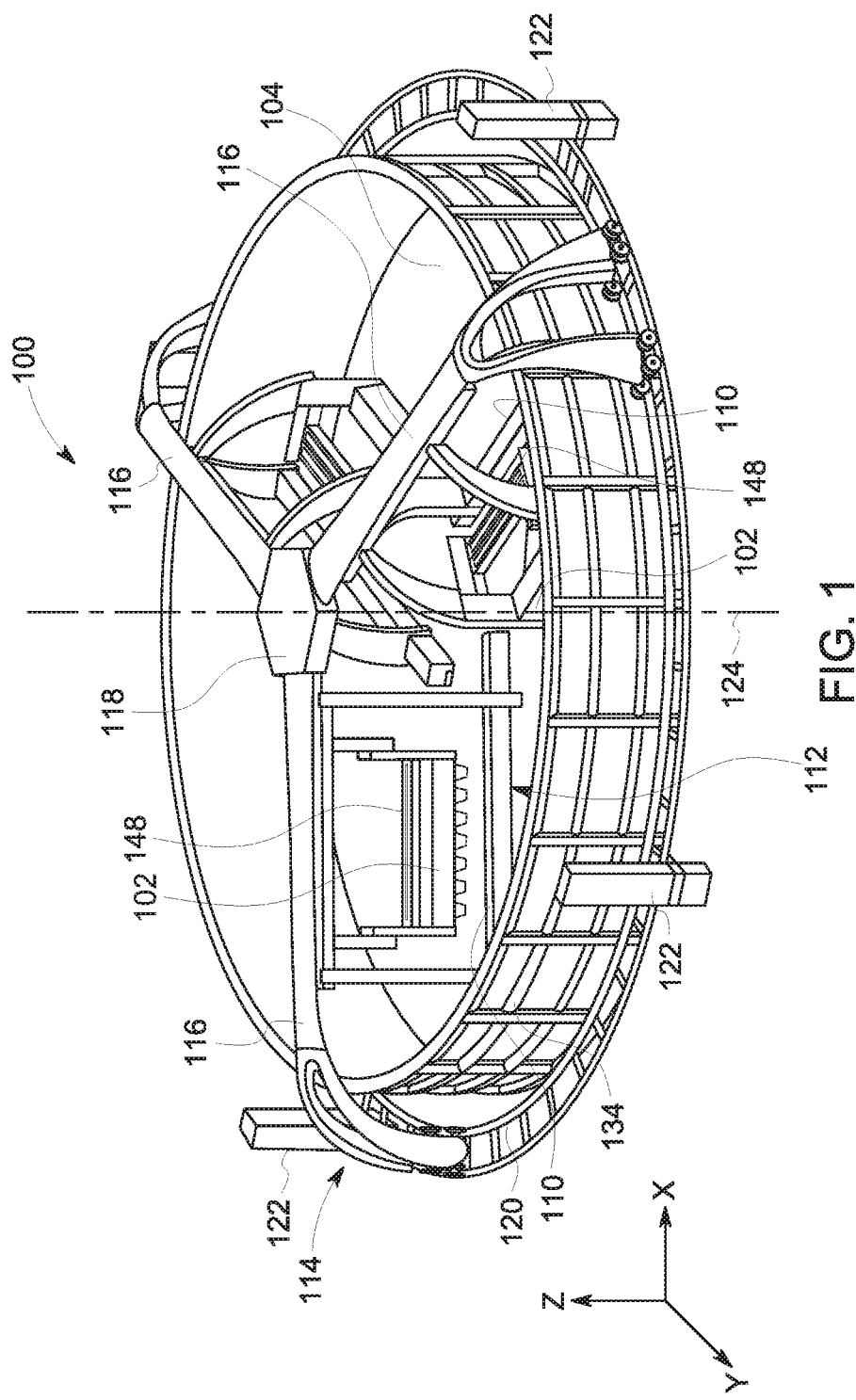
FIG. 1 is a perspective view of an exemplary additive manufacturing system including at least one rotating binder jet print head.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling ProJet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

The systems and methods described herein include an additive manufacturing system including a rotating binder jet print head. The binder jet print head is configured to rotate relative to a build platform and dispense a binder onto a particulate to consolidate the particulate. As the binder jet print head operates, a particulate dispenser and a recoater assembly are configured to dispense and spread particulate on the build platform to provide a continuous fabrication process. In addition, the additive manufacturing system includes a support structure that supports the binder jet print head, the particulate dispenser, and the recoater assembly. An actuator is configured to rotate and raise the binder jet print head, the particulate dispenser, and the recoater assembly relative to the build platform as the additive manufacturing system fabricates a component on the build platform. As a result, the additive manufacturing system is able to fabricate objects of any geometric complexity within the size of the printing system. In addition, the additive manufacturing system is able to provide a multiple helix fabrication process which may fabricate the objects in less time than at least some known additive manufacturing systems. Moreover, the additive manufacturing system is able to be shipped to remote sites and assembled because the support structure, binder jet print heads, particulate dispensers, recoater assemblies, and actuators are modular components.

Figure 2:
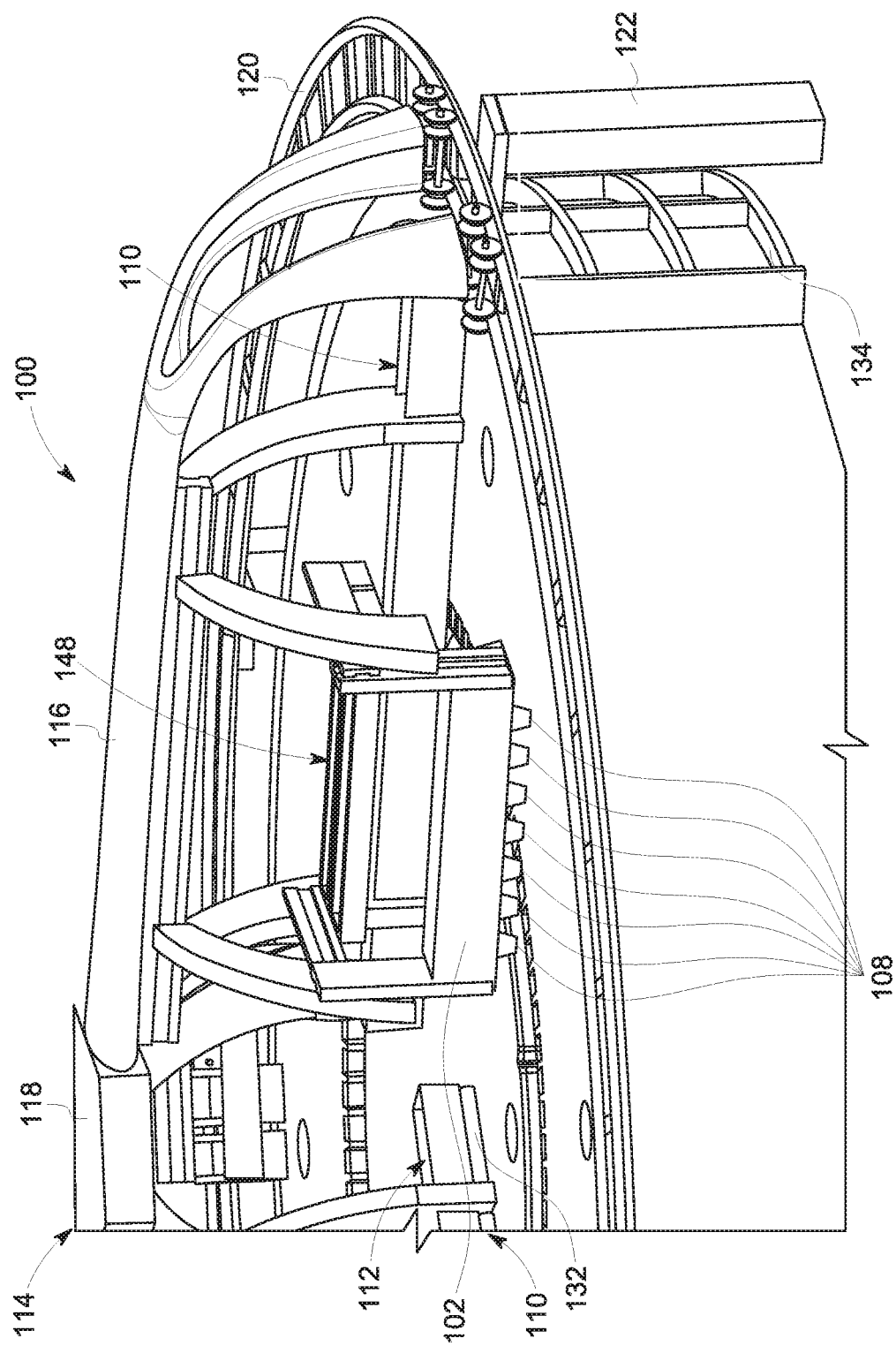
FIG. 2 is an enlarged perspective view of a portion of the additive manufacturing system shown in FIG. 1.
Figure 3:
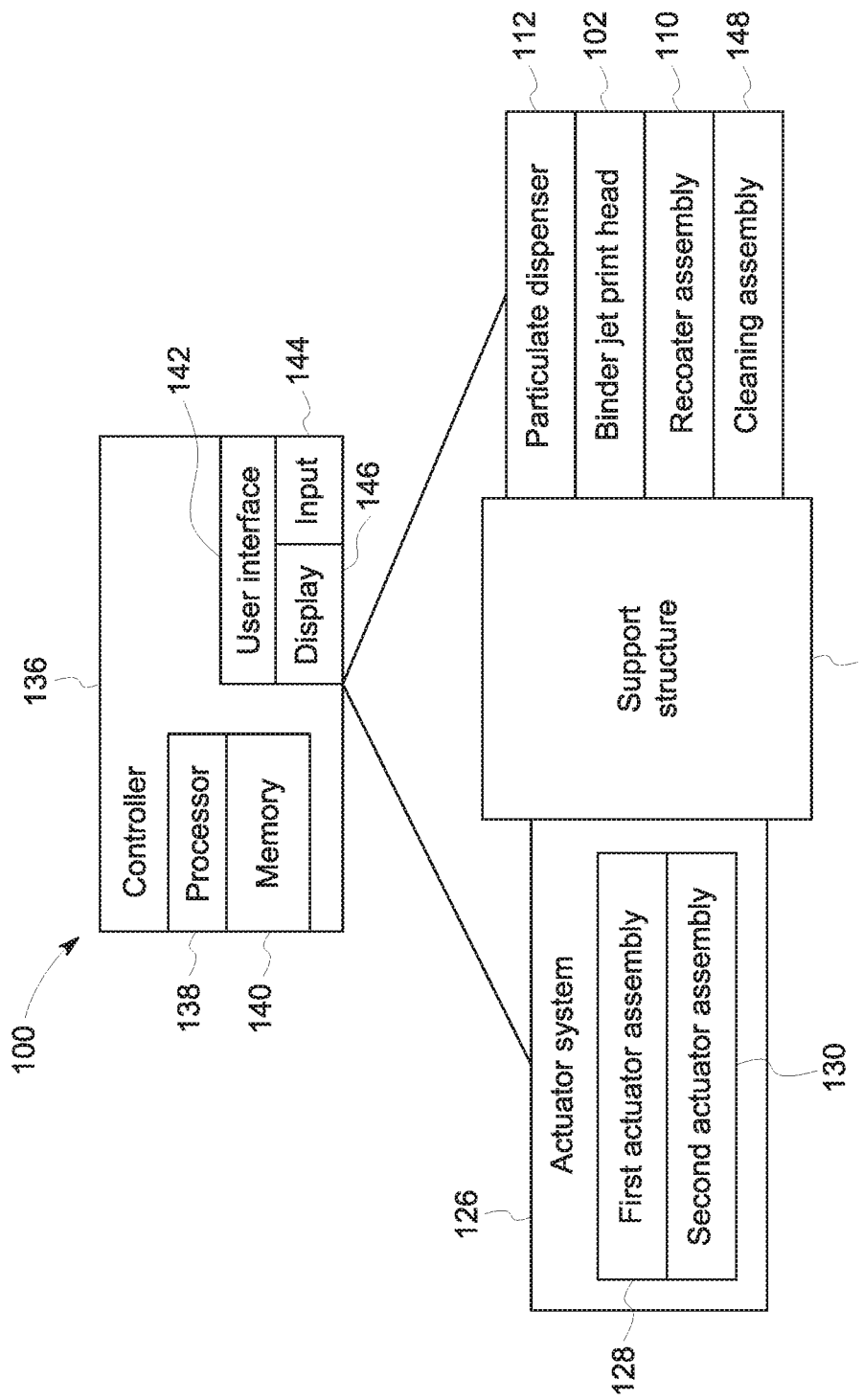
FIG. 3 is a block diagram of the additive manufacturing system shown in FIGS. 1 and 2.

FIG. 1 is a perspective view of an exemplary additive manufacturing system 100 including at least one rotating binder jet print head 102. FIG. 2 is an enlarged perspective view of a portion of additive manufacturing system 100. FIG. 3 is a block diagram of additive manufacturing system 100. A coordinate system of additive manufacturing system 100 includes an X-axis, a Y-axis, and a Z-axis. Additive manufacturing system 100 builds objects, for example, a mold 500 (shown in FIG. 8) for casting a component 518 (shown in FIG. 8). In the exemplary embodiment, additive manufacturing system 100 includes at least one binder jet print head 102 for consolidating particulate. Additive manufacturing system 100 is configured for fabricating an object or component using an additive manufacturing process by depositing a binder onto particulate from binder jet print heads 102. For example, each binder jet print head 102 includes a plurality of outlets or jets 108 and is configured to dispense a binder through jets 108 onto the particulate. Alternatively, additive manufacturing system 100 may include any consolidation device that facilitates consolidation of a material using any of the processes and systems described herein.

In the exemplary embodiment, additive manufacturing system 100 further includes at least one recoater assembly 110 and at least one particulate dispenser 112. Each recoater assembly 110 and particulate dispenser 112 is associated with a respective rotating binder jet print head 102. In the exemplary embodiment, additive manufacturing system 100 includes three recoater assemblies 110, three particulate dispensers 112, and three binder jet print heads 102. In alternative embodiments, additive manufacturing system 100 includes any binder jet print head 102, recoater assembly 110, and/or particulate dispenser 112 that enables additive manufacturing system 100 to operate as described herein. For example, in some embodiments, a single recoater assembly 110 and/or particulate dispenser 112 is associated with a plurality of binder jet print heads 102. In further embodiments, additive manufacturing system 100 includes a single binder jet print head 102.

Also, in the exemplary embodiment, binder jet print heads 102, recoater assemblies 110, and particulate dispensers 112 are coupled to and supported by a support structure 114. Support structure 114 includes at least one arm 116 extending at least partially across build platform 104 and configured to support at least one binder jet print head 102. In the exemplary embodiment, support structure 114 includes a center support 118 and three arms 116 equally spaced about center support 118. Arms 116 extend radially outward from center support 118. Recoater assemblies 110 and particulate dispensers 112 are coupled to arms 116 and positioned adjacent associated binder jet print heads 102 on arms 116. In the exemplary embodiment, each arm 116 supports one binder jet print head 102, one recoater assembly 110, and one particulate dispenser 112. In alternative embodiments, support structure 114 includes any arm 116 that enables additive manufacturing system 100 to operate as described herein. For example, in some embodiments, support structure 114 includes arms that support recoater assemblies 110 and/or particulate dispensers 112 and are distinct from arms 116 that support binder jet print heads 102.

Moreover, in the exemplary embodiment, support structure 114 further includes a track 120 and a plurality of legs 122 that support track 120 at an adjustable height above build platform 104. Track 120 extends around the circumference of build platform 104 and is configured to support arms 116 as arms 116 are rotated about a rotation axis 124. In addition, legs 122 are positionable to adjust the height of support structure 114 relative to build platform 104 during operation of additive manufacturing system 100. For example, the angle of each leg 122 relative to rotation axis 124 is adjustable to change the height of support structure 114 and therefore the distance between build platform 104 and binder jet print heads 102, recoater assemblies 110, and particulate dispensers 112. In some embodiments, a vertical actuator may be used to extend/shorten the length of each leg 122. In alternative embodiments, additive manufacturing system 100 includes any support structure 114 that enables additive manufacturing system 100 to operate as described herein.

During operation of additive manufacturing system 100, particulate is supplied by particulate dispensers 112 and spread evenly over build platform 104 using recoater assemblies 110. Recoater assemblies 110 are configured to control the height of the particulate relative to the height of the previous revolution of the helix and facilitate removal of excess particulate material. Binder jet print heads 102 consolidate a first portion of particulate to form a cross-sectional layer of a component. Recoater assemblies 110 and binder jet print heads 102 are able to operate simultaneously to distribute and consolidate particulate because recoater assemblies 110 are positioned in front of and rotate in coordination with respective binder jet print heads 102. During selective consolidation of the layer of particulate, support structure 114 is raised to elevate binder jet print heads 102, recoater assemblies 110, and particulate dispensers 112 as particulate is spread over build platform 104 and the partial component to allow continuous consolidation of particulate by binder jet print heads 102. The process is continued until the component is completely built up from the consolidated portion of particulate.

Also, in the exemplary embodiment, at least a portion of support structure 114 is moved by an actuator system 126. In the exemplary embodiment, actuator system 126 includes a first actuator assembly 128 and a second actuator assembly 130. First actuator assembly 128 is configured to rotate arm 116 of support structure 114 about rotation axis 124 and second actuator assembly 130 is configured to move arm 116 in the Z-direction (i.e., normal to a top surface of build platform 104), also referred to as the build direction. In some embodiments, actuator system 126 is configured to move at least one binder jet print head 102 in a radial direction relative to rotation axis 124. For example, in some embodiments, binder jet print heads 102 are movable along the length of arms 116 during operation of additive manufacturing system 100. Each actuator assembly 128, 130 includes, for example and without limitation, a linear motor(s), a hydraulic and/or pneumatic piston(s), a screw drive mechanism(s), rotational stages, and/or a conveyor system. In alternative embodiments, additive manufacturing system 100 includes any actuator system 126 that enables additive manufacturing system 100 to operate as described herein. For example, in some embodiments, actuator system 126 is configured to rotate build platform 104 about rotation axis 124 and/or move build platform 104 in the build direction.

In addition, in the exemplary embodiment, particulate dispenser 112 is positioned to deposit particulate in front of recoater assembly 110. In alternative embodiments, particulate is deposited onto build platform 104 in any manner that enables additive manufacturing system 100 to operate as described herein.

Also, in the exemplary embodiment, at least one recoater blade 132 of recoater assembly 110 is positioned to contact particulate in front of the respective binder jet print head 102 and distribute particulate across build platform 104. For example, recoater blade 132 may extend at least partially along a radius of build platform 104. In the exemplary embodiment, recoater blade 132 is rotated with binder jet print head 102 relative to build platform 104. As a result, recoater blade 132 contacts particulate and directs particulate along the length of recoater blade 132 across build platform 104 during operation of additive manufacturing system 100. In addition, recoater assembly 110 maintains a uniform thickness of each layer of particulate on build platform 104 above the prior consolidated layer. In some embodiments, each layer has a thickness in a range of about 10 microns to about 2000 microns. In alternative embodiments, recoater assembly 110 includes any recoater blade 132 that enables additive manufacturing system 100 to operate as described herein.

Moreover, in the exemplary embodiment, additive manufacturing system 100 further includes a wall 134 extending around build platform 104 to define a build container. In the exemplary embodiment, build platform 104 is generally circular. Wall 134 is generally cylindrical and fully surrounds particulate on build platform 104. In alternative embodiments, build platform 104 and/or wall 134 may be any shapes that facilitate operation of additive manufacturing system 100 as described herein. In further embodiments, wall 134 may surround a portion of particulate and/or may be coupled to any other wall or component that facilitates operation of additive manufacturing system 100 as described herein. In addition, in some embodiments, additive manufacturing system 100 includes an inner particulate containment wall (not shown) that reduces the amount of particulate required to assemble the component. The inner particulate containment wall may be cylindrical. In embodiments including an inner particulate containment wall, particulate may be dispensed adjacent the inner particulate containment wall and consolidated to form a shape such as a pipe shape having a cavity near the central region of build platform 104.

Also, in the exemplary embodiment, binder jet print heads 102 are configured to consolidate particulate on different areas of build platform 104 and are configured to consolidate different portions of particulate simultaneously. Support structure 114 and binder jet print heads 102 are able to rotate at an increased speed during fabrication of a component because a plurality of binder jet print heads 102 are used to consolidate particulate. In alternative embodiments, additive manufacturing system 100 includes any number of binder jet print heads 102 including a single binder jet print head 102.

Moreover, in the exemplary embodiment, additive manufacturing system 100 includes a computer control system, or controller 136. Controller 136 includes a processor 138, a memory 140, and a user interface 142 including an input device 144 and a display 146. Controller 136 controls operation of binder jet print head 102 to facilitate directing binder onto the surface of particulate of a build layer to form a layer of the component. For example, controller 136 controls the amount of binder that is dispensed through each nozzle or jet 108 of binder jet print heads 102.

In the exemplary embodiment, additive manufacturing system 100 is operated to fabricate a component from a computer modeled representation of the 3D geometry of the component. The computer modeled representation may be produced in a computer aided design (CAD) or similar file. The CAD file of the component is converted into a format that includes a plurality of build parameters for one or more helical layers of the component. For example, a build layer of the component includes a particulate to be consolidated by additive manufacturing system 100. In the exemplary embodiment, the component is modeled in a desired orientation relative to the origin of the coordinate system used in additive manufacturing system 100. The geometry of the component is sliced into one or more helical layers. Ink jet firing sequences are generated across the geometry of a respective layer. The build parameters are applied for each firing sequence to fabricate that layer of the component from particulate. Once the process is completed, an electronic computer build file (or files) is generated, including all of the layers. The build file is loaded into controller 136 of additive manufacturing system 100 to control the system during fabrication of each layer.

After the build file is loaded into controller 136, additive manufacturing system 100 is operated to generate the component by implementing the additive manufacturing process, such as a binder jet printing method. The exemplary additive manufacturing process does not use a pre-existing article as the precursor to the final component, rather the process produces components from a raw material in a configurable form, such as particulate. For example, and without limitation, a mold can be additively manufactured using sand that is consolidated using a binder. Additive manufacturing system 100 enables fabrication of components using a broad range of materials, for example, and without limitation, metals, ceramics, glass, and polymers.

Moreover, in the exemplary embodiment, during operation of additive manufacturing system, controller 136 is able to control the position of support structure 114 to adjust the height of binder jet print head 102. For example, FIG. 1 shows support structure 114 in an initial position with binder jet print head 102 positioned adjacent build platform 104. FIG. 2 shows support structure in an elevated position with binder jet print head 102 located a distance from build platform 104. In the exemplary embodiment, support structure 114 is moved vertically by adjusting the positions or lengths of legs 122 using actuator system 126. In alternative embodiments, support structure 114 is moved in any manner that enables additive manufacturing system 100 to operate as described herein.

In some embodiments, controller 136 controls the rotational speed and/or vertical movement speed of binder jet print heads 102, particulate dispensers 112, and/or recoater blades 132 based on operating parameters of additive manufacturing system 100. Operating parameters of additive manufacturing system 100 include, for example and without limitation, the configuration of particulate dispensers 112, the configuration of recoater assembly 110, number and types of binder jet print heads 102, and size of build platform 104.

In addition, in the exemplary embodiment, controller 136 coordinates the rotational speeds of binder jet print heads 102, recoater blades 132, and/or particulate dispensers 112 to accommodate local variations in build time requirements. For example, controller 136 determines layers or sections of layers that require more or less build time due to variations in the thickness of angular sectors of the component and controller 136 adjusts the rotation rate of binder jet print heads 102, recoater blades 132, and/or particulate dispensers 112 to maintain the sections within the build area for the required time for binder jet print head 102 to complete consolidation of each section.

Also, in the exemplary embodiment, additive manufacturing system 100 includes a cleaning assembly 148 positionable adjacent each binder jet print head 102 and configured to clean binder jet print head 102. For example, cleaning assembly 148 is coupled to arm 116 and is able to clean binder jet print head 102 without requiring disassembly of additive manufacturing system 100.

Figure 4:
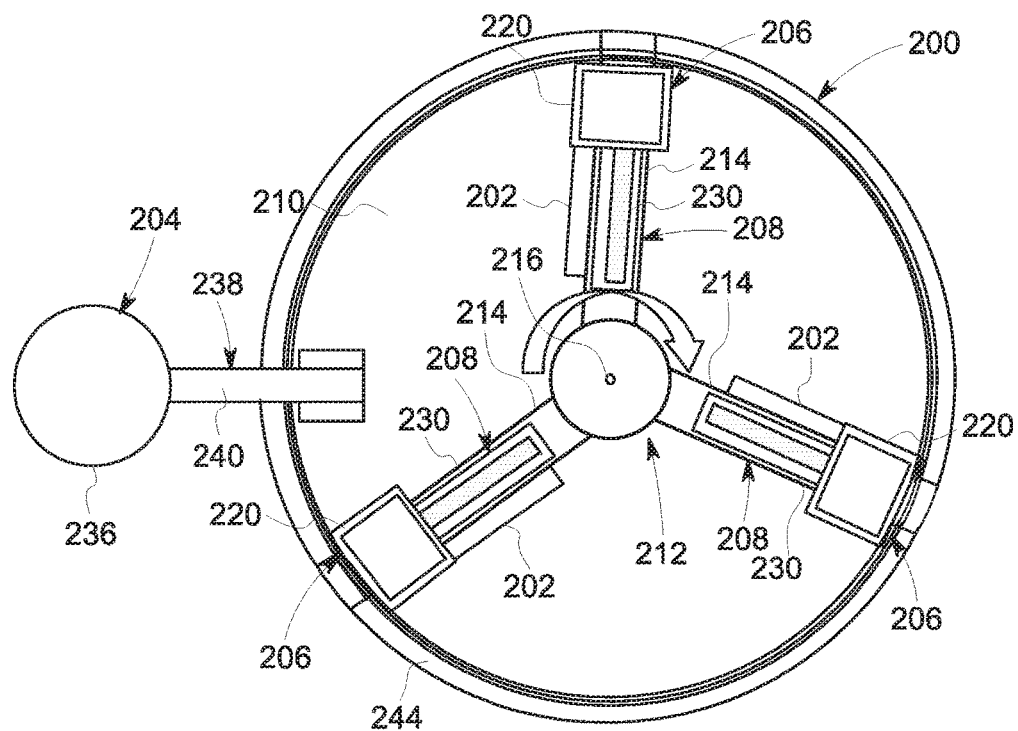
FIG. 4 is a schematic plan view of an embodiment of an additive manufacturing system including at least one rotating binder jet print head and a feed system.

FIG. 4 is a schematic plan view of an additive manufacturing system 200 including at least one rotating binder jet print head 202 and a feed system 204. Additive manufacturing system 200 includes binder jet print heads 202, feed system 204, at least one particulate dispenser 206, at least one recoater assembly 208, a build platform 210, and a support structure 212. Support structure 212 includes a plurality of arms 214 that support binder jet print heads 202, particulate dispensers 206, and recoater assemblies 208. Binder jet print heads 202, particulate dispensers 206, and recoater assemblies 208 rotate relative to build platform 210 about a rotation axis 216 extending through build platform 210.

Figure 5:
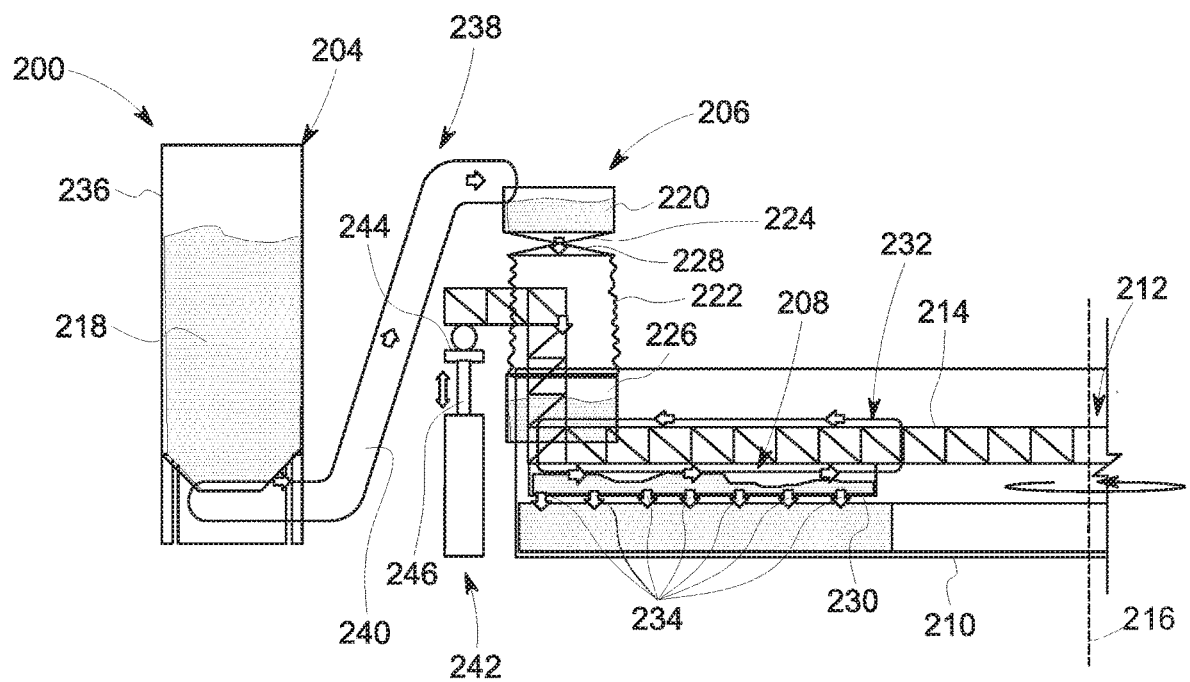
FIG. 5 is a schematic side view of the additive manufacturing system shown in FIG. 4.

FIG. 5 is a schematic side view of additive manufacturing system 200. During operation of additive manufacturing system 200, particulate dispensers 206 deposit particulate 218 on build platform 210 and recoater assemblies 208 spread particulate 218 evenly over build platform 210 as particulate dispensers 206 and recoater assemblies 208 rotate relative to build platform 210. Recoater assemblies 208 are configured to control the height of particulate 218 relative to the height of the previous revolution of the helix and facilitate removal of excess particulate 218. Binder jet print heads 202 selectively consolidate particulate 218 to form a cross-sectional layer of a component. During selective consolidation of the layer of particulate 218, arms 214 of support structure 212 are raised to elevate binder jet print heads 202, recoater assemblies 208, and particulate dispensers 206 as particulate 218 is spread over build platform 210 and the partial component to allow continuous consolidation of particulate 218 by binder jet print heads 202. The process is continued until the component is completely built up from the consolidated portion of particulate 218.

In addition, in the exemplary embodiment, each particulate dispenser 206 includes an upper hopper or reservoir 220, a conduit 222 coupled to an outlet 224 of upper hopper 220, a lower hopper or reservoir 226 coupled to conduit 222, and a valve 228 configured to regulate flow of the particulate from upper hopper 220 and through conduit 222 to lower hopper 226. In the exemplary embodiment, upper hopper 220 and conduit 222 are positioned above lower hopper 226 and particulate is gravity fed to lower hopper 226. In some embodiments, a sensor (not shown) such as a weight scale or proximity switch provides feedback for use in controlling particulate dispenser 206. For example, particulate dispenser 206 may be controlled to provide appropriate feed rates of particulate 218 to build platform 210 and regulate the amount of particulate 218 on build platform 210.

In addition, in the exemplary embodiment, each particulate dispenser 206 includes a trough or conduit 230 extending along the respective arm 214 and a conveyor apparatus 232 configured to convey particulate 218 through trough 230. Each trough 230 is in flow communication with and receives particulate from the respective lower hopper 226 of particulate dispenser 206. Conveyor apparatus 232 includes, for example and without limitation, a belt conveyor, an auger, and/or any other conveyor apparatus. Conveyor apparatus 232 carries particulate 218 along a length of trough 230 so that particulate 218 is dispensed in a desired manner. For example, in some embodiments, additional particulate 218 is dispensed at locations spaced from the center of build platform 210 because of the greater relative rotational speed of particulate dispenser 206 at distances spaced from the axis of rotation. Trough 230 includes a plurality of outlets 234 for particulate 218 to exit trough 230 as conveyor apparatus 232 carries particulate 218 along trough 230. Conveyor apparatus 232 also carries excess particulate 218, i.e., particulate that is not dispensed through outlets 234, back along the length of trough 230 towards lower hopper 226. In alternative embodiments, additive manufacturing system 200 includes any particulate dispenser 206 that enables particulate dispenser 206 to operate as described herein.

In the exemplary embodiment, feed system 204 is configured to deliver particulate to each particulate dispenser 206. Feed system 204 includes a supply reservoir 236 and a particulate transfer assembly 238 that is configured to transfer particulate from supply reservoir 236 to each particulate dispenser 206. For example, transfer assembly 238 includes a lift or conveyor apparatus 240 to carry particulate 218 to upper hopper 220. In the exemplary embodiment, feed system 204 is stationary relative to build platform 210. Accordingly, feed system 204 is positioned to align with each particulate dispenser 206 at a specific angular position along the rotational path of particulate dispensers 206. In some embodiments, particulate dispenser 206 pauses or stops at the designated rotational location to receive particulate 218. In further embodiments, feed system 204 delivers particulate 218 to particulate dispenser 206 as particulate dispenser 206 rotates. In alternative embodiments, additive manufacturing system 200 includes any feed system 204 that enables additive manufacturing system 200 to operate as described herein. For example, in some embodiments such as the embodiment shown in FIG. 14, particulate dispenser 206 may be positioned at the center of support structure 212 rather than at the outer circumference of support structure 212.

Also, in the exemplary embodiment, additive manufacturing system 200 includes an actuator system 242 configured to rotate support structure 212 about rotation axis 216 and raise support structure 212 in a direction perpendicular to build platform 210. For example, actuator system 242 includes a rotary actuator (not shown) configured to rotate support structure 212 on a track 244. In addition, in the exemplary embodiment, actuator system 242 includes a vertical actuator 246 configured to raise track 244, and therefore support structure 212 positioned on track 244, relative to build platform 210. Vertical actuator 246 includes a hydraulic actuator or any other actuator that enables actuator system 242 to function as described herein. In alternative embodiments, additive manufacturing system 200 includes any actuator system 242 that enables additive manufacturing system 200 to operate as described herein.

Figure 14:
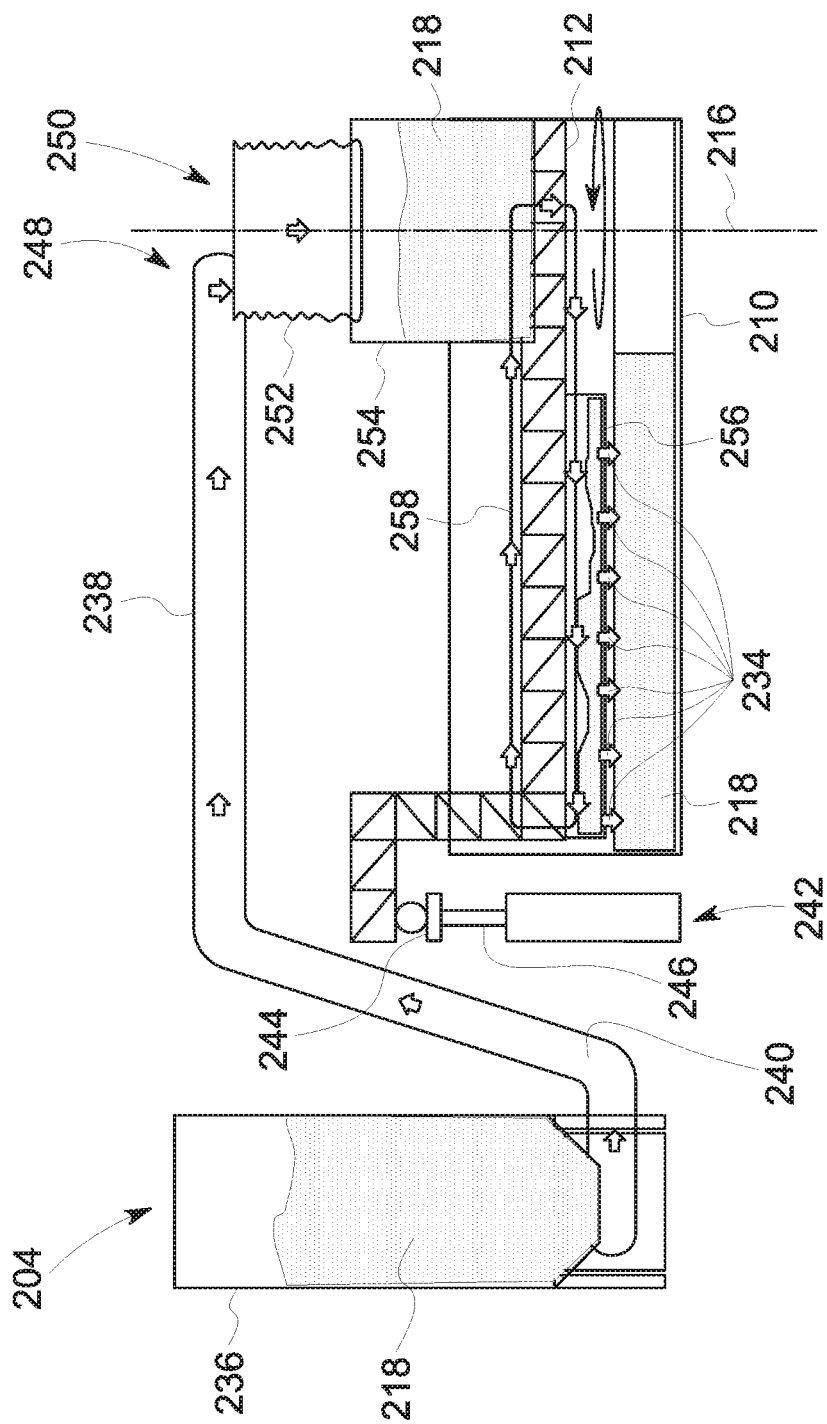
FIG. 14 is a schematic side view of an additive manufacturing system including a rotating feed system.

FIG. 14 is a schematic side view of an additive manufacturing system 248. Additive manufacturing system 248 is similar to additive manufacturing system 200 (shown in FIGS. 4 and 5) except additive manufacturing system 248 includes a particulate dispenser 250 positioned in a center of support structure 212 and aligned with a center of build platform 210. In the exemplary embodiment, particulate dispenser 250 is mounted to and rotates with support structure 212.

In addition, in the exemplary embodiment, particulate dispenser 250 includes a conduit 252, a central hopper or reservoir 254 coupled to conduit 252, a trough or conduit 256 extending along each arm 214, and a conveyor apparatus 258 configured to convey particulate 218 through each trough 256. Each trough 256 is in flow communication with and receives particulate from central hopper 254 of particulate dispenser 250. In alternative embodiments, additive manufacturing system 200 includes any particulate dispenser 206 that enables particulate dispenser 206 to operate as described herein.

In the exemplary embodiment, feed system 204 is configured to deliver particulate 218 to particulate dispenser 250. Specifically, particulate transfer assembly 238 extends from supply reservoir 236 across a radius of build platform 210 to conduit 252 of particulate dispenser 250. Conduit 252 is configured to receive particulate 218 and direct particulate to central hopper 254 as particulate dispenser 250 rotates relative to feed system 204. For example, in some embodiments, conduit 252 includes an inlet for particulate 218 to enter conduit 252 from transfer assembly 238 and an outlet for particulate 218 to be dispensed into central hopper 254. Also, conduit 252 includes a seal or valve such as a bellows seal to prevent leakage of particulate 218 from conduit 252 and/or control particulate flow through dispenser 250. In alternative embodiments, additive manufacturing system 248 includes any feed system 204 that enables additive manufacturing system 200 to operate as described herein. For example, in some embodiments, supply reservoir 236 is positioned at a center of build platform 210.

Figure 6:
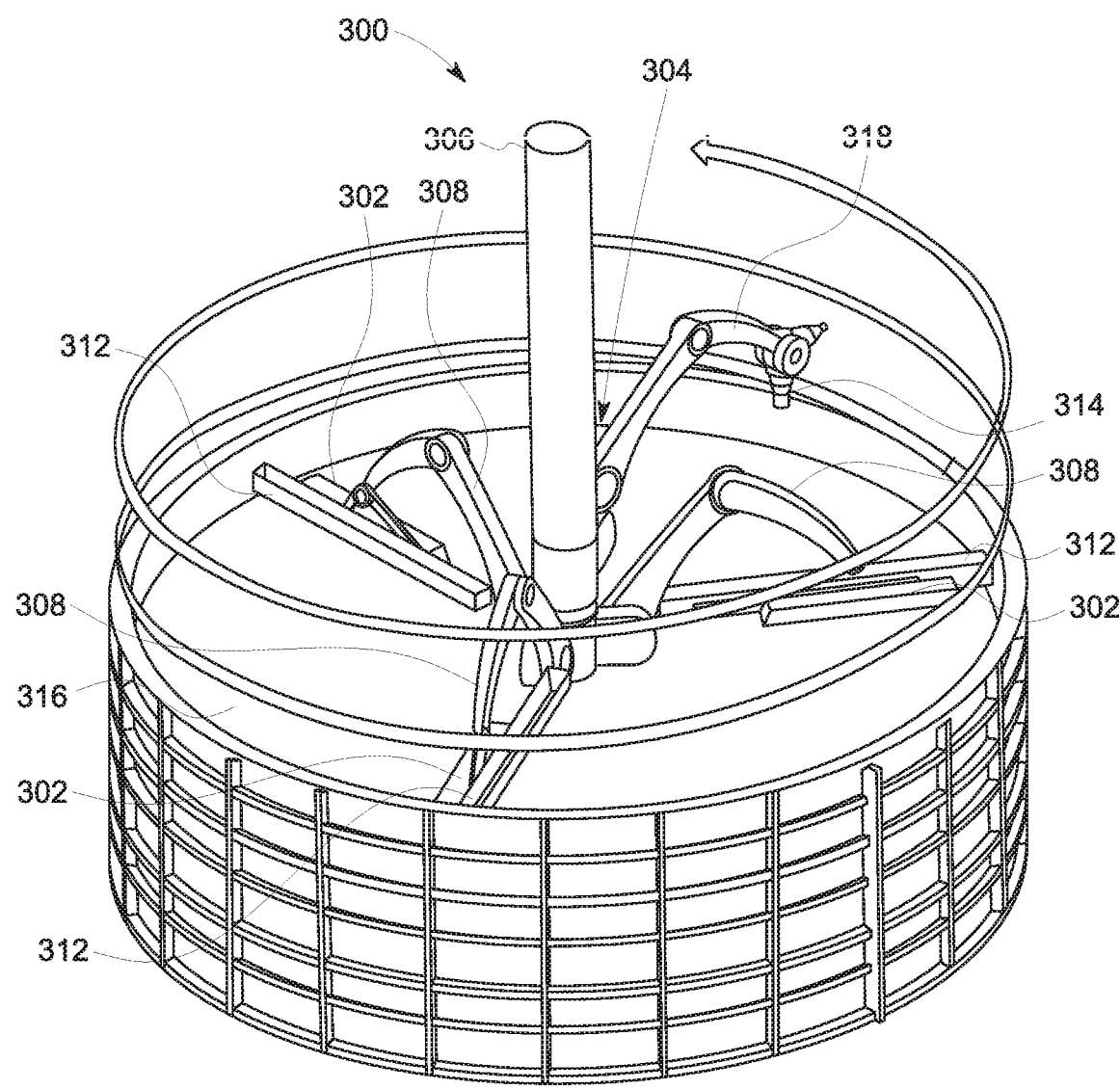
FIG. 6 is a perspective view of an embodiment of an additive manufacturing system including a rotating binder jet print head and a plurality of articulated arms.

FIG. 6 is a perspective view of an embodiment of an additive manufacturing system 300 including at least one rotating binder jet print head 302 and a plurality of articulated arms. Additive manufacturing system 300 includes a support structure 304 including a central support 306 and a plurality of first articulated arms 308 extending at least partly radially outward from central support 306. Binder jet print heads 302 and recoater assemblies 312 are coupled to ends of first articulated arms 308. First articulated arms 308 are positionable to adjust the location of binder jet print heads 302 and recoater assemblies 312 relative to a build platform 316. In addition, first articulated arms 308 are rotatably coupled to central support 306 such that binder jet print heads 302 and recoater assemblies 312 are rotatable relative to build platform 316. Recoater assemblies 312 are coupled to first articulated arms 308 adjacent binder jet print heads 302 such that recoater assemblies 312 spread particulate in front of binder jet print heads 302 as first articulated arms 308 rotate relative to build platform 316 about central support 306.

Also, in the exemplary embodiment, particulate dispenser 314 is coupled to a second articulated arm 318 that allows positioning of particulate dispenser 314 relative to build platform 316. Particulate dispenser 314 is able to move radially relative to build platform by positioning second articulated arm 318. In some embodiments, the angular position of particulate dispenser 314 about a center of build platform 316 is fixed as binder jet print heads 302 and recoater assemblies 312 rotate relative to build platform 316. Accordingly, particulate dispenser 314 is able to deposit particulate for each recoater assembly 312 to spread across build platform 316 for binder jet print heads 302 to consolidate. In alternative embodiments, additive manufacturing system 300 includes any particulate dispenser 314 that enables additive manufacturing system 300 to operate as described herein. For example, in some embodiments, additive manufacturing system 300 includes a plurality of particulate dispensers 314.

Figure 7:
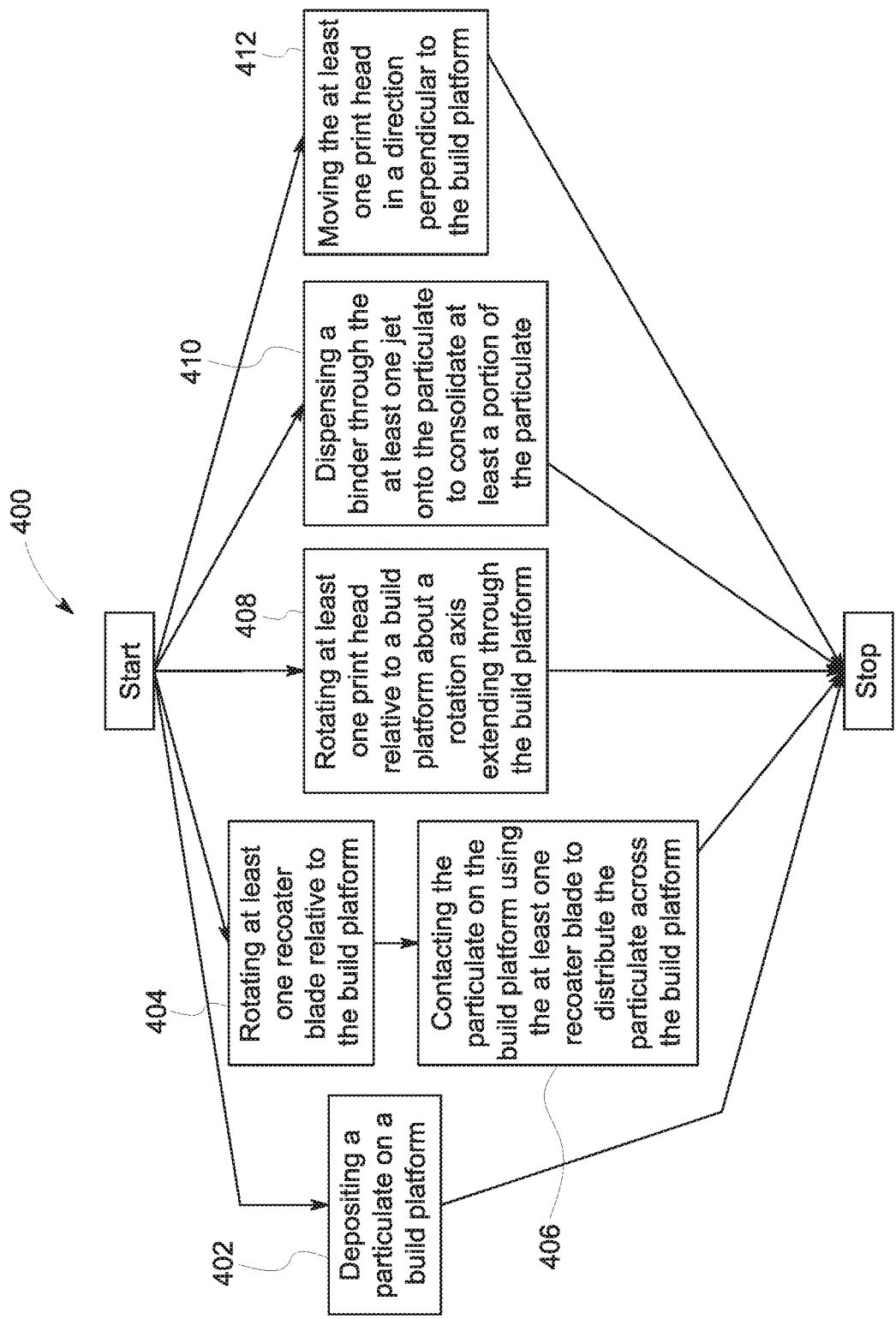
FIG. 7 is a flow chart of an exemplary method of fabricating a component using an additive manufacturing system including a rotating binder jet print head.

FIG. 7 is a flow chart of an exemplary method 400 of fabricating a component using additive manufacturing system 100 (shown in FIGS. 1-3), additive manufacturing system 200 (shown in FIGS. 4 and 5), or additive manufacturing system 300 (shown in FIG. 6). In reference to FIGS. 1-3 and 7, method 400 includes depositing 402 particulate on build platform 104. For example, particulate is deposited on build platform 104 using particulate dispenser 112. Particulate dispenser 112 is rotated relative to build platform 104 and deposits particulate in front of recoater blade 132 and binder jet print heads 102 relative to the direction of rotation of particulate dispenser 112. In some embodiments, particulate dispenser 112 receives particulate from feed system 204 (shown in FIGS. 4 and 5). In alternative embodiments, particulate is deposited on build platform 104 in any manner that enables additive manufacturing system 100 to operate as described herein.

In addition, method 400 includes rotating 404 at least one recoater blade 132 relative to build platform 104 and contacting 406 particulate on build platform 104 using at least one recoater blade 132 to distribute particulate across build platform 104. Also, method 400 includes rotating 408 at least one binder jet print head 102 relative to build platform 104 about rotation axis 124 extending through build platform 104. For example, in some embodiments, arms 116 supporting binder jet prints head 102 and recoater blades 132 are rotated about rotation axis 124 using actuator system 126. In alternative embodiments, recoater blades 132 and/or recoater blades 132 are rotated in any manner that enables additive manufacturing system 100 to operate as described herein.

Also, method 400 includes dispensing 410 a binder through jet 108 onto particulate to consolidate at least a portion of particulate. In some embodiments, particulate includes sand and the binder is configured to bind the sand together to form a component such as a portion of a mold.

Moreover, method 400 includes moving 412 at least one binder jet print head 102 in a direction perpendicular to build platform 104. For example, support structure 114 supports binder jet print heads 102, recoater blades 132, and particulate dispensers 112 and is rotated and raised by actuator system 126 during operation of additive manufacturing system 100.

In some embodiments, build platform 104 is rotated relative to binder jet print head 102 and/or moved in the build direction during fabrication of the component. For example, in some embodiments, build platform 104 is rotated relative to binder jet print heads 102. In further embodiments, build platform 104 is lowered as binder jet print heads 102 or build platform 104 is rotated.

In the exemplary embodiment, method 400 allows binder jet print heads 102 and recoater blades 132 to operate simultaneously and provide a helical build process in which a component is fabricated using a plurality of helical build layers. As a result, the time required to fabricate components using additive manufacturing system 100 (shown in FIGS. 1-3), additive manufacturing system 200 (shown in FIGS. 4 and 5), and/or additive manufacturing system 300 (shown in FIG. 6) is reduced.

Figure 8:
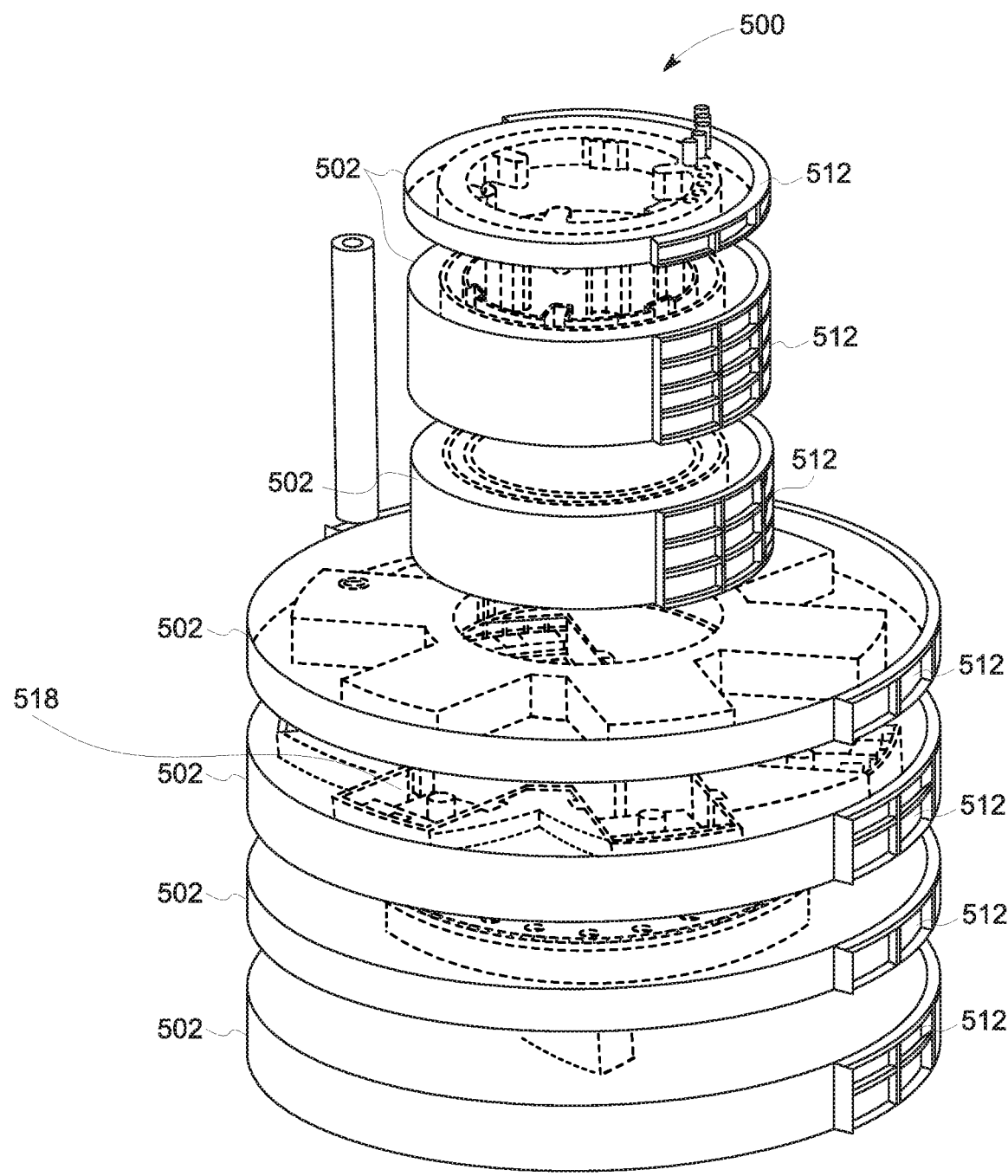
FIG. 8 is a schematic perspective view of a mold assembled from mold portions fabricated using an additive manufacturing system including a rotating binder jet print head.

FIG. 8 is a schematic perspective view of a mold 500 assembled from components fabricated using additive manufacturing system 100 (shown in FIGS. 1-3), additive manufacturing system 200 (shown in FIGS. 4 and 5), and/or additive manufacturing system 300 (shown in FIG. 6). For example, additive manufacturing system 100, 200, 300 is used to fabricate a plurality of mold portions or layers 502 which are assembled into mold 500. In the exemplary embodiment, mold 500 is a sand mold and each mold portion 502 is formed from sand. As a result, mold 500 may have an increased size and a reduced cost in comparison to molds formed from other materials.

Figure 9:
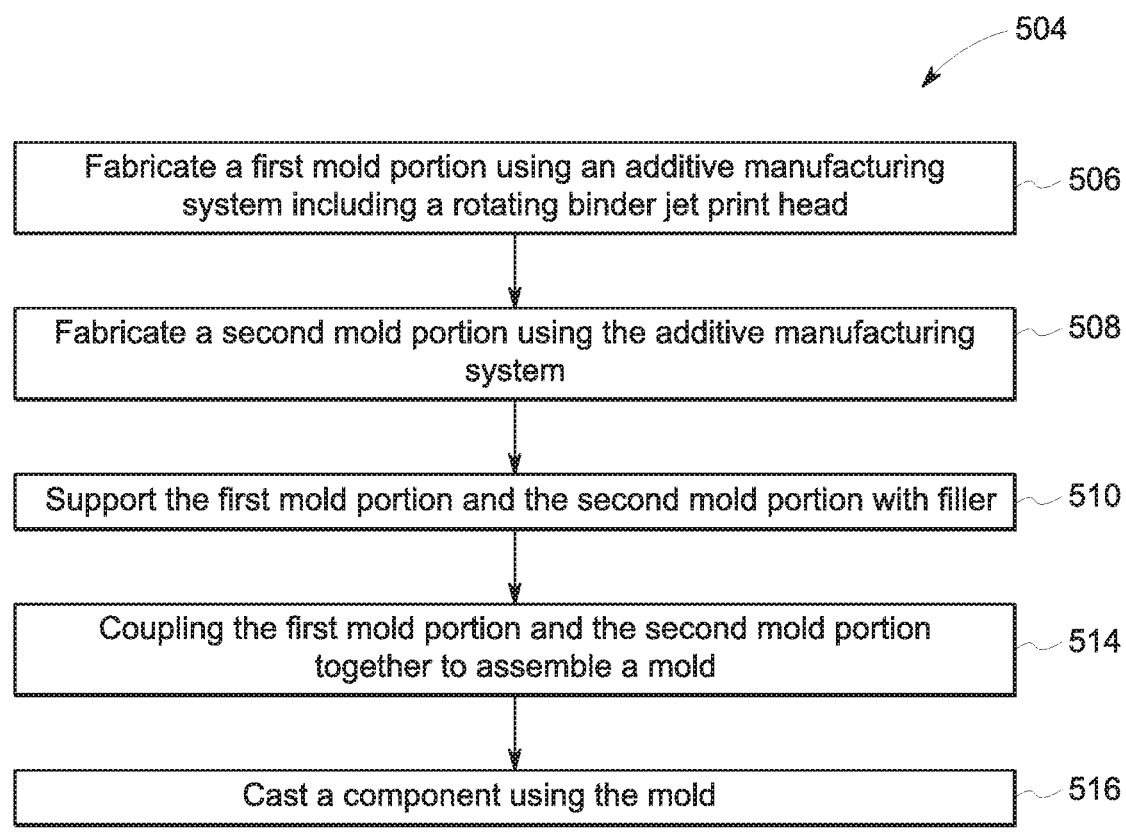
FIG. 9 is a flow chart of an exemplary method of casting a component using the mold shown in FIG. 8.

FIG. 9 is a flow chart of an exemplary method 504 of casting a component using mold 500 (shown in FIG. 8). In reference to FIGS. 1, 4, 6, 8, and 9, method 504 includes fabricating 506 first mold portion 502 using additive manufacturing system 100, 200, 300 including rotating binder jet print heads 102, 202, 302 and fabricating 508 second mold portion 502 using additive manufacturing system 100, 200, 300 including rotating binder jet print heads 102, 202, 302.

Also, method 504 includes supporting 510 first mold portion 502 and second mold portion 502 with filler such as sand. In some embodiments, unconsolidated particulate 218 (shown in FIG. 5) is removed and filler sand, which may be less expensive than particulate 218, is positioned around mold portions 502. In addition, in some embodiments, each mold portion 502 is surrounded by a cask or flask 512. Also, in some embodiments, one or more chills (not shown) are positioned on, adjacent, and/or in mold portions 502 to control the solidification of a component formed using mold 500. In further embodiments, a coating is applied to at least a portion of mold portions 502. In alternative embodiments, mold portions 502 are supported and treated in any manner that enables mold 500 to function as described herein.

In addition, method 504 includes coupling 514 first mold portion 502 and second mold portion 502 together to assemble mold 500. In the exemplary embodiment, mold portions 502 are stacked in a vertical arrangement. In alternative embodiments, mold portions 502 are assembled in any manner that enables mold 500 to function as described herein.

Also, method 504 optionally includes repeating any of steps 508, 510, and 514 for any number of iterations to assemble mold 500 from any number of mold portions 502.

Moreover, method 504 includes casting 516 a component 518 using mold 500. For example, in some embodiments, cavities in mold 500 are filled with one or more precursor materials in liquid form and the materials are solidified to form component 518.

Figure 10:
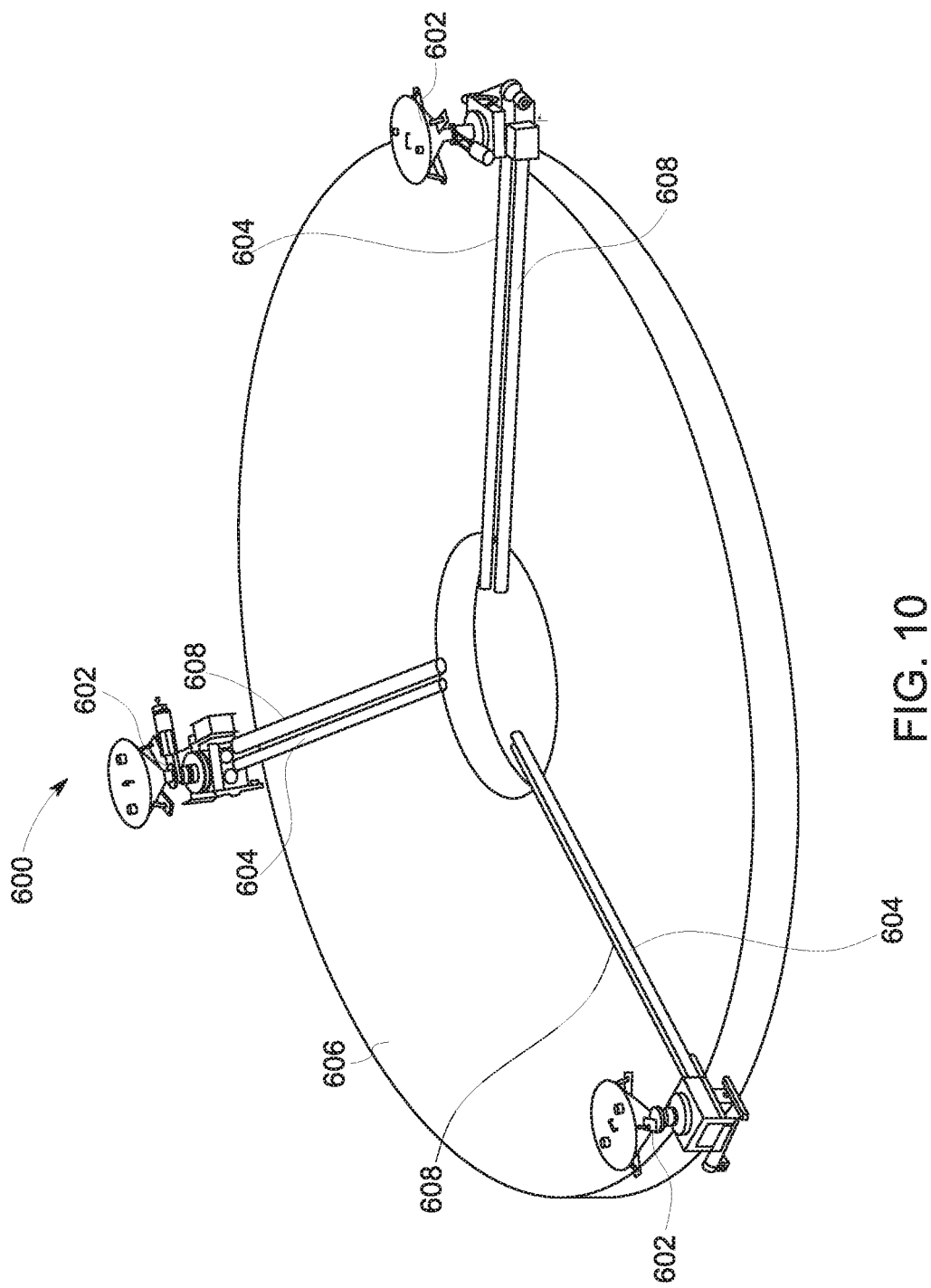
FIG. 10 is a perspective view of an exemplary embodiment of a particulate feed and dispenser system for an additive manufacturing system including a rotating binder jet print head.

FIG. 10 is a perspective view of an exemplary embodiment of a particulate feed and dispenser system 600. Particulate feed and dispenser system 600 may be used with additive manufacturing system 100 (shown in FIGS. 1 and 2), additive manufacturing system 200 (shown in FIGS. 3 and 4), and/or additive manufacturing system 300 (shown in FIG. 6). In alternative embodiments, feed and dispenser system 600 may be used with any additive manufacturing system that enables feed and dispenser system 600 to function as described herein.

In the exemplary embodiment, feed and dispenser system 600 includes a plurality of feed assemblies 602 and a plurality of dispenser assemblies 604. Each dispenser assembly 604 is coupled to and receives particulate from a respective feed assembly 602. In addition, each dispenser assembly 604 extends radially across build platform 606 and is configured to dispense particulate onto build platform 606. In addition, feed and dispenser system 600 includes a recoater assembly 608 coupled to each dispenser assembly 604. Recoater assembly 608 is configured to spread particulate across build platform 606. In some embodiments, at least a portion of feed and dispenser system 600 is configured to rotate relative to build platform 606 as dispenser assemblies 604 dispense particulate and as recoater assemblies 608 spread particulate across build platform 606. In alternative embodiments, feed and dispenser system 600 includes any dispenser assembly 604 and/or recoater assembly 608 that enables particulate feed and dispenser system 600 to operate as described herein.

Figure 11:
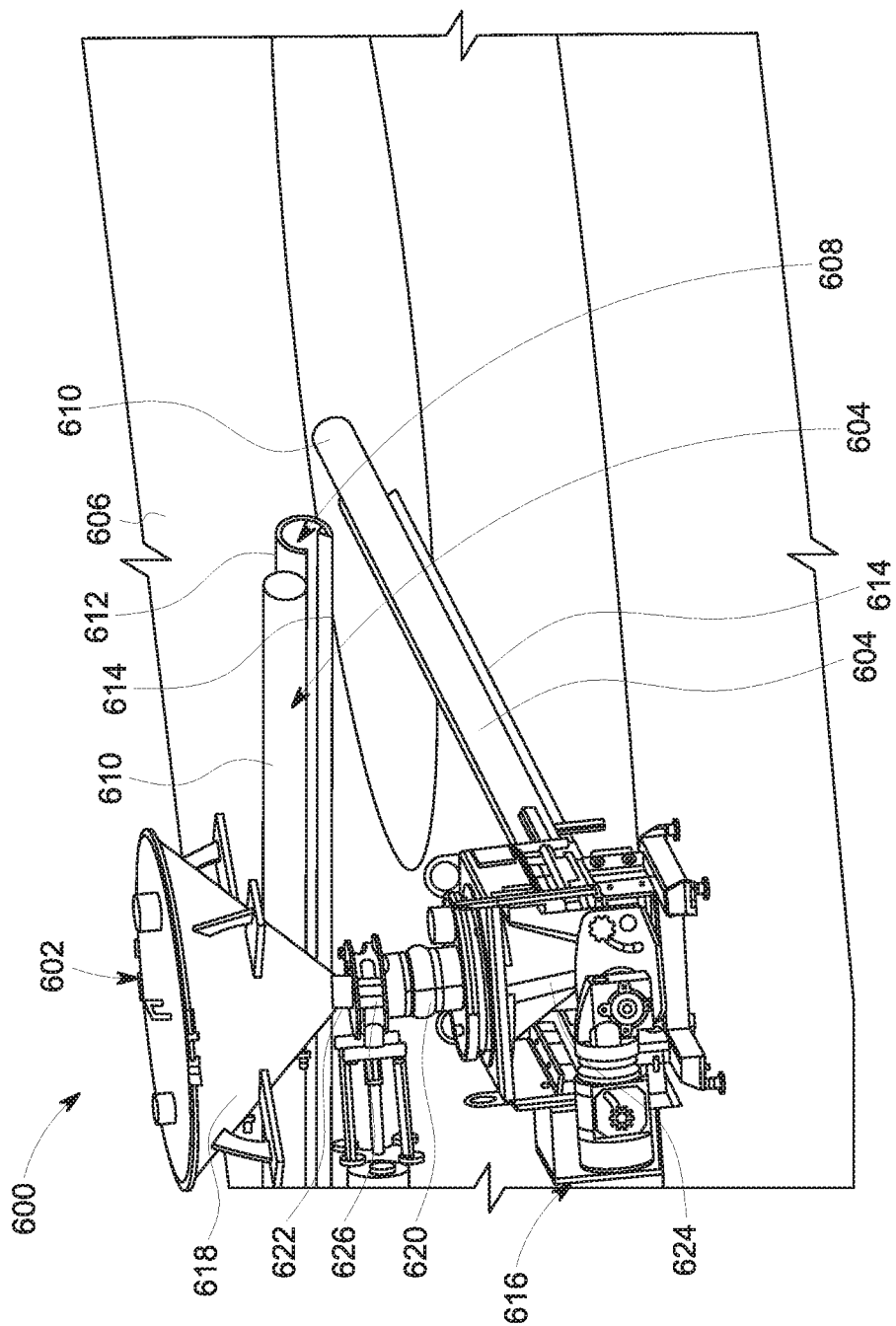
FIG. 11 is an enlarged perspective view of a portion of the particulate feed and dispenser system shown in FIG. 10.

FIG. 11 is an enlarged perspective view of a portion of particulate feed and dispenser system 600. In the exemplary embodiment, each dispenser assembly 604 includes a conduit 610 that receives particulate from feed assembly 602 and dispenses the particulate. Recoater assemblies 608 are coupled to conduit 610. Each recoater assembly 608 includes a return conduit 612 and a recoater blade 614 coupled to return conduit 612. Return conduit 612 defines a cavity to receive excess particulate as recoater blade 614 spreads the particulate across build platform 606. A conveyor apparatus 616 is configured to carry particulate through return conduit 612 towards feed assemblies 602. In some embodiments, conveyor apparatus 616 includes an auger (not shown) positioned within return conduit 612 and a motor configured to rotate the auger. In alternative embodiments, feed and dispenser system 600 includes any dispenser assembly 604 that enables feed and dispenser system 600 to operate as described herein.

Also, in the exemplary embodiment, each feed assembly 602 includes an upper hopper 618, a conduit 620 coupled to an outlet 622 of upper hopper 618, a lower hopper 624 coupled to conduit 620, and a valve 626 configured to regulate flow of the particulate from upper hopper 618 and through conduit 620 to lower hopper 624. During operation of particulate feed and dispenser system 600, particulate is directed from feed assembly 602 into conduit 610 of dispenser assembly 604 and particulate is dispensed through outlets onto build platform 606. In some embodiments, conveyor apparatus 616 or a separate conveyor apparatus (not shown in FIG. 11) is configured to direct particulate through conduit 610. For example, an auger may be positioned in conduit 610 to direct and dispense particulate along the length of conduit 610. In such embodiments, the distal end of conduit 610 is at least partially open to allow particulate to exit conduit 610. In some embodiments, a container or collection device is positioned to collect particulate as particulate exits conduit 610. In alternative embodiments, feed and dispenser system 600 includes any feed assembly 602 that enables feed and dispenser system 600 to operate as described herein.

In addition, in the exemplary embodiment, recoater blade 614 contacts particulate and spreads particulate across build platform 606 in a layer having a desired thickness. Excess particulate is received in conduit 612 and directed towards feed assembly 602 by conveyor apparatus 616.

Particulate feed and dispenser system 600 is configured to provide one or more layers of particulate for consolidation by binder jet print heads 102 (shown in FIGS. 1-3), binder jet print heads 202 (shown in FIGS. 4 and 5), or binder jet print heads 302 (shown in FIG. 6). In some embodiments, particulate feed and dispenser system 600 is rotated relative to build platform 606 in coordination with binder jet print heads 102, 202, 302. In further embodiments, at least a portion of particulate feed and dispenser system 600, such as feed assembly 602, is stationary relative to build platform 606.

Figure 12:
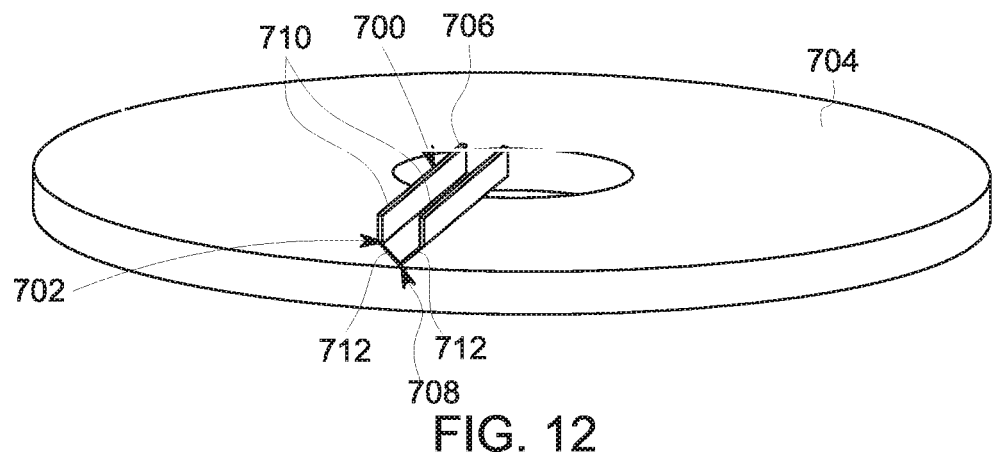
FIG. 12 is a perspective view of an exemplary embodiment of a recoater assembly for an additive manufacturing system including a rotating binder jet print head.
Figure 13:
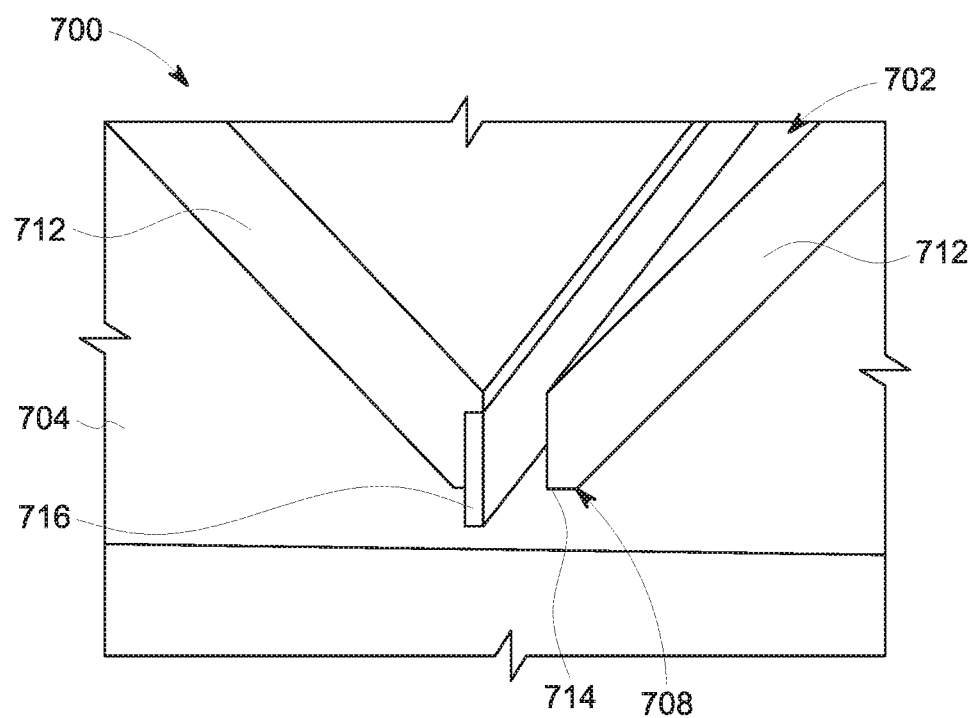
FIG. 13 is an enlarged perspective view of a portion of the recoater assembly shown in FIG. 12.

FIG. 12 is a perspective view of a portion of a recoater assembly 700. FIG. 13 is an enlarged perspective view of a portion of recoater assembly 700. Recoater assembly 700 may be used with additive manufacturing system 100 (shown in FIGS. 1 and 2), additive manufacturing system 200 (shown in FIGS. 3 and 4), and/or additive manufacturing system 300 (shown in FIG. 6). In alternative embodiments, recoater assembly 700 may be used with any additive manufacturing system that enables recoater assembly 700 to function as described herein.

In the exemplary embodiment, recoater assembly 700 includes a trough 702 extending across a build platform 704. Trough 702 includes a top 706, a bottom 708 opposite top 706, and opposed walls 710 extending between top 706 and bottom 708. Top 706 is substantially open. Bottom 708 includes angled walls 712 forming a funnel shape. Bottom 708 defines an outlet 714 adjacent build platform 704. Particulate received within trough 702 is funneled downward towards outlet 714 and is dispensed from trough 702 through outlet 714. In alternative embodiments, recoater assembly 700 includes any trough 702 that enables recoater assembly 700 to operate as described herein.

In addition, in the exemplary embodiment, outlet 714 is sized to restrict the amount of particulate that flows out of trough 702. For example, a width of outlet 714 is less than the width of top 706 through which particulate may be received in trough 702. Accordingly, in the exemplary embodiment, particulate fills trough 702 as particulate is provided to trough 702 at a greater rate than particulate exits outlet 714. Particulate is provided to and directed through recoater assembly 700 in any manner that enables recoater assembly 700 to operate as described herein. In some embodiments, recoater assembly 700 includes a valve (not shown) to control the flow of particulate provided to trough 702. In further embodiments, recoater assembly 700 includes a conveyor apparatus (not shown in FIGS. 12 and 13) to direct particulate in at least one direction along the length of trough 702.

Also, in the exemplary embodiment, a recoater blade 716 is coupled to trough 702 adjacent outlet 714. Recoater blade 716 is configured to spread particulate across build platform 704 as particulate exits trough 702 through outlet 714. Recoater blade 716 is removably coupled to trough 702 to allow removal and replacement of recoater blade 716. In alternative embodiments, recoater assembly 700 includes any recoater blade 716 that enables recoater assembly 700 to operate as described herein.

The embodiments described herein include an additive manufacturing system including a rotating binder jet print head. The binder jet print head is configured to rotate relative to a build platform and dispense a binder onto a particulate to consolidate the particulate. As the binder jet print head operates, a particulate dispenser and a recoater assembly are configured to dispense and spread particulate on the build platform to provide a continuous fabrication process. In addition, the additive manufacturing system includes a support structure that supports the binder jet print head, the particulate dispenser, and the recoater assembly. An actuator is configured to rotate and raise the binder jet print head, the particulate dispenser, and the recoater assembly relative to the build platform as the additive manufacturing system fabricates a component on the build platform. As a result, the additive manufacturing system is able to fabricate objects of any complexity. In addition, the additive manufacturing system is able to provide a multiple helical fabrication process which may fabricate the objects in less time than at least some known additive manufacturing systems. Moreover, the additive manufacturing system is able to be shipped to remote sites and assembled because the support structure, binder jet print heads, particulate dispensers, recoater assemblies, and actuators are modular components.

An exemplary technical effect of the methods, systems, and apparatus described herein includes at least one of: a) reducing the time required to fabricate components using an additive manufacturing system, b) providing an additive manufacturing system that is able to fabricate components of any complexity, c) providing an additive manufacturing system that allows a consolidation device and a recoater assembly to operate simultaneously during fabrication of a component, d) simplifying the mechanisms required to deposit particulate onto the build platform, e) reducing the cost of additively manufacturing a component, and f) providing additive manufacturing systems that are modular and able to fabricate components in situ.

Exemplary embodiments of additive manufacturing systems are described above in detail. The additive manufacturing systems, and methods of using and manufacturing such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other additive manufacturing systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
   a build platform configured to receive a particulate;
   a particulate dispenser configured to deposit the particulate on said build platform;
   at least one print head including at least one jet, said at least one print head configured to dispense a binder through said at least one jet onto the particulate to consolidate at least a portion of the particulate and form a component;
   a support structure comprising at least one arm extending radially outward from a center support at least partially across said build platform;
   said at least one print head supported by and suspended below said at least one arm; and
   at least one actuator assembly configured with said support structure to rotate at least one of said at least one arm with suspended said print head and said build platform about a rotation axis extending through said build platform and to raise a radial end of said at least one arm relative to the build platform to move said at least one arm with suspended said print head in a build direction perpendicular to said build platform as part of a helical build process for the component.

2. The additive manufacturing system in accordance with claim 1 further comprising at least one recoater blade positioned adjacent said build platform and configured to contact the particulate deposited on said build platform and to distribute the particulate across said build platform, wherein said at least one recoater blade is coupled to said at least one arm, and wherein said at least one actuator assembly is further configured to rotate said at least one arm and said at least one recoater blade relative to said build platform.

3. The additive manufacturing system in accordance with claim 2, wherein said at least one arm comprises a first arm supporting said at least one print head and said at least one recoater blade.

4. The additive manufacturing system in accordance with claim 2, wherein said at least one arm comprises a first arm supporting said at least one print head and a second arm supporting said at least one recoater blade.

5. The additive manufacturing system in accordance with claim 4, wherein said at least one actuator assembly comprises a first actuator configured to rotate said first arm relative to said build platform and a second actuator configured to rotate said second arm relative to said build platform.

6. The additive manufacturing system in accordance with claim 1, wherein said print head is a first print head, said additive manufacturing system further comprising a second print head, said at least one actuator assembly configured to rotate said second print head relative to said build platform about the rotation axis.

7. The additive manufacturing system in accordance with claim 1, wherein said build platform is circular, and wherein said additive manufacturing system further comprises a cylindrical wall extending around said build platform to define a build container, the rotation axis extending through a center of said build platform.

8. The additive manufacturing system in accordance with claim 7, wherein said support structure comprises a track around said cylindrical wall, said radial end of said at least one arm riding along said track, said at least one actuator assembly configured to move said track in the build direction.

9. The additive manufacturing system in accordance with claim 8 further comprising at least one leg coupled to said track, and wherein said at least one actuator assembly is configured to adjust a position of said at least one leg to move said track and said at least one print head in the build direction.

10. The additive manufacturing system in accordance with claim 1, further comprising a cleaning assembly positionable adjacent said at least one print head and configured to clean said at least one print head.

11. The additive manufacturing system in accordance with claim 1, wherein said particulate dispenser is coupled to said at least one arm adjacent said at least one print head and is configured to deposit the particulate on said build platform as said at least one print head rotates, said particulate dispenser dispensing the particulate in front of said at least one print head relative to a direction of rotation of said at least one print head.

12. The additive manufacturing system in accordance with claim 11 further comprising a particulate reservoir and a particulate transfer assembly configured to transfer particulate from said particulate reservoir to said particulate dispenser during rotation of said at least one print head.

13. An additive manufacturing system comprising:
a build platform configured to receive a particulate;
a particulate dispenser configured to deposit the particulate on said build platform;
at least one print head including at least one jet, said at least one print head configured to dispense a binder through said at least one jet onto the particulate to consolidate at least a portion of the particulate and form a component;
a support structure comprising at least one arm extending radially from a center support, said print head supported by and suspended from said at least one arm; and
at least one actuator assembly configured to rotate said at least one print head relative to said build platform about a rotation axis extending through a center of said build platform and raise a radial end of said at least one arm relative to the build platform in a build direction perpendicular to said build platform as said at least one print head is rotated.

14. The additive manufacturing system in accordance with claim 13 further comprising at least one recoater blade configured to contact the particulate deposited on said build platform and to distribute the particulate across said build platform, wherein said at least one actuator assembly is further configured to rotate said at least one recoater blade about the rotation axis and move said at least one recoater blade in the build direction.

15. The additive manufacturing system in accordance with claim 14 further comprising at least one arm supporting said at least one print head and said at least one recoater blade, wherein said at least one arm extends at least partly across said build platform and is configured to rotate relative to said build platform.

16. The additive manufacturing system in accordance with claim 15, wherein said radial end of said at least one arm is supported on said support structure and further comprising at least one leg coupled to said support structure, wherein said at least one actuator assembly is configured to adjust a position of said at least one leg to move said at least one print head in the build direction.

* * * * *